US008564673B2

(12) United States Patent
Omi

(10) Patent No.: US 8,564,673 B2
(45) Date of Patent: Oct. 22, 2013

(54) INFORMATION PROCESSING METHOD AND INFORMATION PROCESSING APPARATUS FOR DISPLAYING ANOMALOUS PIXEL, AND RADIOGRAPHIC SYSTEM

(75) Inventor: Hiroyuki Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/860,371

(22) Filed: Aug. 20, 2010

(65) Prior Publication Data

US 2011/0049374 A1 Mar. 3, 2011

(30) Foreign Application Priority Data

Aug. 28, 2009 (JP) ................................. 2009-198410

(51) Int. Cl.
*H04N 5/225* (2006.01)
*H04N 9/64* (2006.01)
*G01T 1/24* (2006.01)

(52) U.S. Cl.
USPC .................. 348/207.99; 348/246; 250/370.08

(58) Field of Classification Search
USPC ......................... 348/246, 207.99; 250/370.08
See application file for complete search history.

(56) References Cited

U.S. PATENT DOCUMENTS

| | | | | |
|---|---|---|---|---|
| 6,661,456 | B1 | 12/2003 | Aufrichtig et al. | |
| 2003/0072501 | A1* | 4/2003 | Enomoto | 382/311 |
| 2004/0061785 | A1 | 4/2004 | Aufrichtig et al. | |
| 2006/0078224 | A1* | 4/2006 | Hirosawa | 382/284 |
| 2008/0230708 | A1* | 9/2008 | Enomoto | 250/370.08 |
| 2008/0231734 | A1* | 9/2008 | Enomoto | 348/246 |
| 2008/0239115 | A1* | 10/2008 | Sugizaki | 348/246 |
| 2009/0033774 | A1* | 2/2009 | Ohishi et al. | 348/241 |

FOREIGN PATENT DOCUMENTS

| | | |
|---|---|---|
| JP | 2000-126162 A | 5/2000 |
| JP | 2001-008928 A | 1/2001 |

* cited by examiner

*Primary Examiner* — Tuan Ho
*Assistant Examiner* — Shahbaz Nazrul
(74) *Attorney, Agent, or Firm* — Canon USA Inc. IP Division

(57) ABSTRACT

An information processing apparatus of the present invention includes an acquisition unit configured to acquire a predetermined image and an image after correction which corrected an anomalous pixel of the predetermined image, and a display control unit configured to display an image expanding a partial region of the predetermined image including the anomalous pixel and a pixel used for correcting the anomalous pixel, and the image after correction.

20 Claims, 13 Drawing Sheets

○: PIXEL USED IN CORRECTION

INFORMATION PROCESSING METHOD AND INFORMATION PROCESSING APPARATUS FOR DISPLAYING ANOMALOUS PIXEL, AND RADIOGRAPHIC SYSTEM

BACKGROUND OF THE INVENTION

1. Field of the Invention

The present invention relates to an information processing apparatus for displaying an anomalous pixel of an image obtained by an image capturing apparatus, an information processing system, an information processing method, and a storage medium storing a program causing a computer to execute the information processing.

2. Description of the Related Art

An image captured by a digital image capturing apparatus is configured with a plurality of pixels representing a color and shading. However, in the plurality of pixels, a pixel termed an anomalous pixel is present. The anomalous pixel refers to a defective pixel which indicates a value out of an output range determined in advance with respect to predetermined input owing to abnormality of a circuit and an element in an image capturing apparatus, and a pixel which indicates a value of other abnormality or failure. The anomalous pixel affects image quality of a captured image. Thus, the anomalous pixel is corrected by replacing the anomalous pixel, for example, with an average pixel value of the pixels surrounding it. Then, the image after correction is provided to a user.

This correction processing is in most cases automatically executed and may sometimes become unnatural. Thus, a technique to confirm suitability of correction is required.

In Japanese Patent Application Laid-Open No. 2001-8928, a technique is discussed in which the whole of an image before correction and the whole of an image after correction are displayed side by side in a different position on a screen to easily confirm suitability of correction. Further, in Japanese Patent Application Laid-Open No. 2000-126162, a technique is discussed in which an image region designated by a user among images after correction is switched to an image before correction for display.

However, correction of the anomalous pixel is executed in a local region. Thus, an influence of the correction on the image quality is local. In addition, when the whole images before and after correction are compared in confirming suitability of correction, a user may make a misjudgment being affected by the entire image information. In a technique discussed in Japanese Patent Application Laid-Open No. 2001-8928, the whole of images before and after correction is displayed respectively. Therefore, it cannot compare local regions. In a technique discussed in Japanese Patent Application Laid-Open No. 2000-126162, only one of images before and after correction can be displayed. Therefore, it is not suitable for making comparison by grasping characteristics of respective images at the same time.

SUMMARY OF THE INVENTION

The present invention is directed to a technique which determines a suitable local region to allow comparison between images before and after correction.

According to an aspect of the present invention, an information processing apparatus includes an acquisition unit configured to acquire an image after correction including a pixel which corrected an anomalous pixel of a predetermined image, a determination unit configured to determine a region of a partial image including the anomalous pixel of the predetermined image and a pixel used in correction thereof, and a display control unit configured to display side by side the determined region of the partial image and a region corresponding to the partial image of the acquired image after correction.

According to another aspect of the present invention including such a configuration, since a partial image including an anomalous pixel and a pixel used in correction thereof, and an image after correction are displayed side by side, the images can be compared in a local region while grasping characteristics of the images, and how an anomalous pixel is corrected can accurately be confirmed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
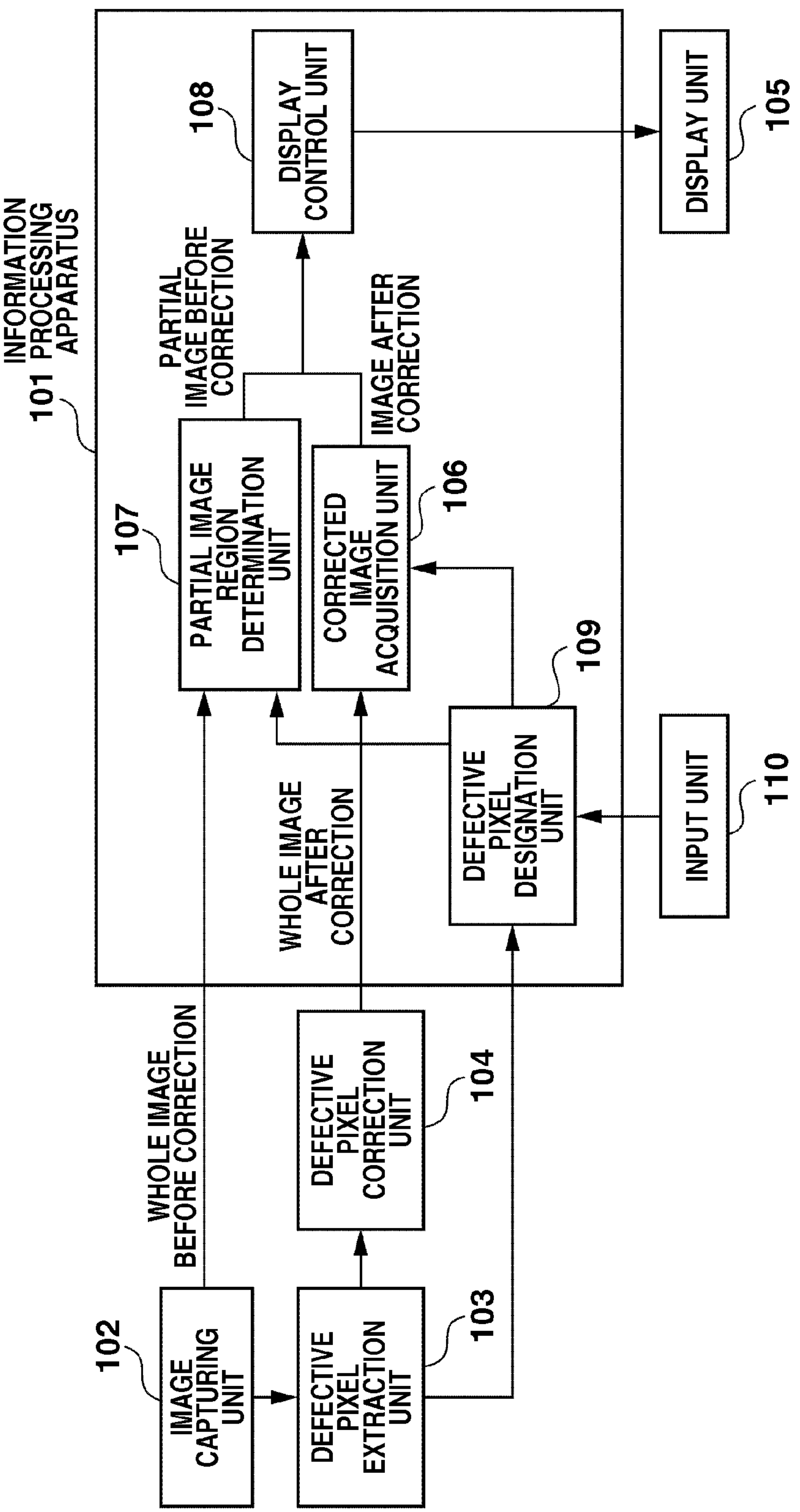
FIG. 1 is a block diagram illustrating an information processing apparatus according to a first exemplary embodiment.

Referring to FIGS. 1 and 6, a first exemplary embodiment will be described below.

Figure 2:
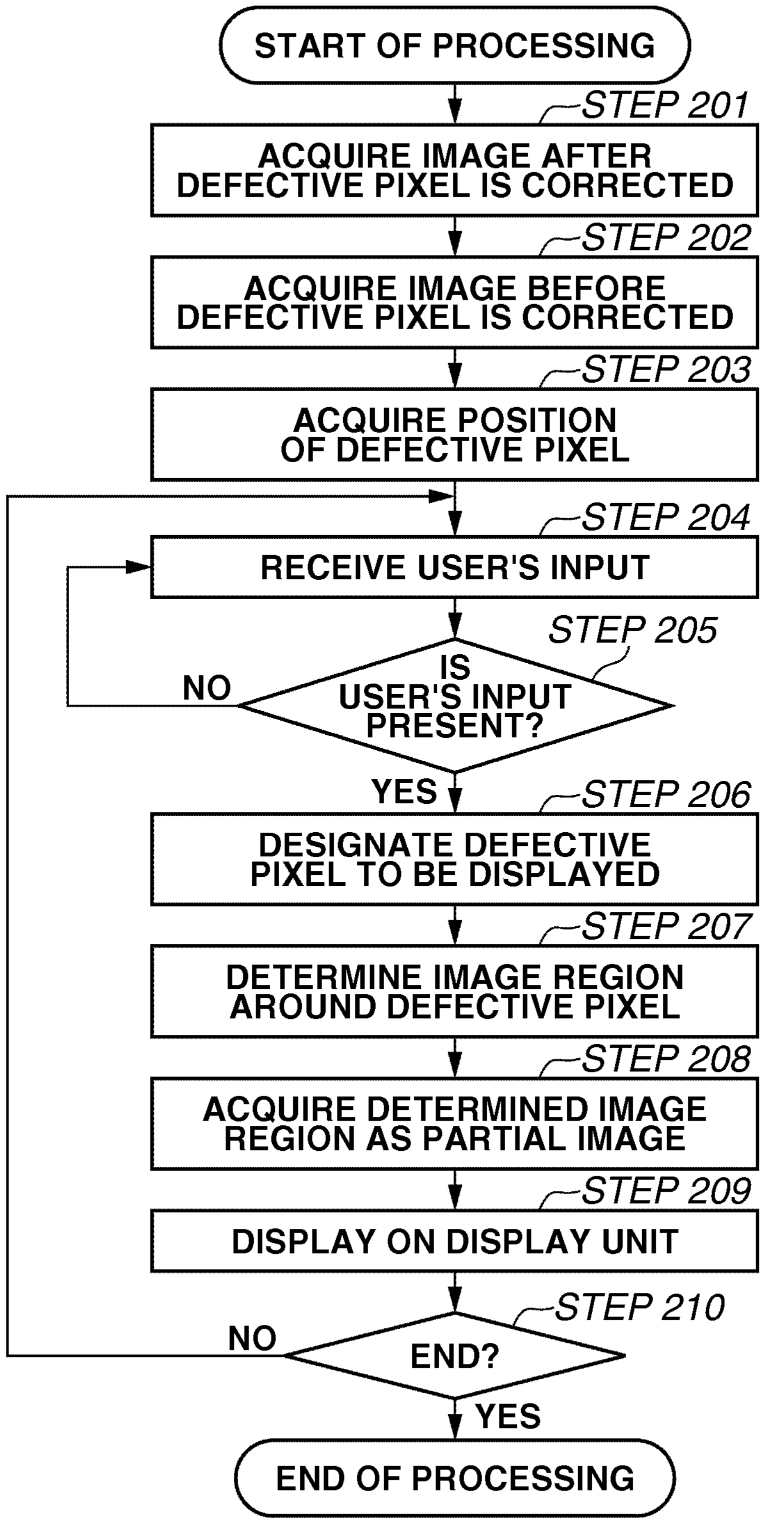
FIG. 2 is a diagram illustrating flow of processing to be executed by an information processing apparatus.

An information processing apparatus according to the present exemplary embodiment acquires an image including a corrected pixel from an image after correction and acquires a partial image around a defective pixel from an image before correction to arrange and display them side by side. FIG. 1 is a diagram illustrating a configuration of the information processing apparatus. FIG. 2 is a flowchart illustrating flow of processing to be executed by this information processing apparatus. FIGS. 3 and 6 are examples of a display screen on a display unit in which an apparatus having a configuration in FIG. 1 executes processing in FIG. 2.

A configuration of the information processing apparatus illustrated in FIG. 1 will be described. The information processing apparatus 101 extracts a defective pixel of an image captured in an image capturing unit 102 by a defective pixel extraction unit 103. As a method for extracting a defective pixel, for example, by using a definition example of an anomalous pixel, a pixel which is separate from an average pixel value in a predetermined region by 8 times or more a standard deviation value, is set to a defective pixel. A pixel to be extracted by this method may contain an anomalous pixel other than the defective pixel.

The pixel extracted as a defective pixel by a defective pixel correction unit 104 is corrected. Thus, an image after correction is acquired. Further, an image before correction in which a defective image is not corrected is acquired. Partial images of the images after and before correction are displayed side by side on a display unit 105.

A corrected image acquisition unit 106 in the information processing apparatus 101 acquires an image after correction which corrected a defective pixel, from the outside, thus an image including a pixel which corrected a defective pixel is acquired. This image after correction may also be a whole image, an image around a designated defective pixel, or an image including only pixels which corrected a defective pixel.

A partial image region determination unit 107 determines an image region including at least a defective pixel and a pixel to be used in the correction based on a position of a defective pixel in an image before a defective pixel obtained from the outside is corrected. This determined region is acquired as a partial image. The partial image region determination unit 107 functions as a region acquisition unit configured to acquire the determined partial region as a coordinate value. Coordinate information about the acquired region is transmitted to a display control unit 108.

The display control unit 108 display side by side a region of a partial image having a defective pixel determined by the partial image region determination unit 107 and a region corresponding to a partial image in an image after correction acquired by the corrected image acquisition unit 106. The display control unit 108 generates image data for their display and executes control to display them on the display unit 105. The regions displayed side by side refer to a case where they are disposed close to each other so that respective regions can be compared.

A defective pixel designation unit 109 designates a defective pixel to be displayed. The defective pixel designation unit 109 designates a defective pixel according to input by an input unit 110 and notifies the corrected image acquisition unit 106 and the partial image region determination unit 107 of a position of the defective pixel. Based on this information, the partial image region determination unit 107 determines an image region to be acquired as a partial image.

In designating a defective pixel by the defective pixel designation unit 109 and making correction by the defective pixel correction unit 104, a defective pixel map is used which is data about a defective pixel extracted by the defective pixel extraction unit 103. The defective pixel map is data that represents a position of a defective pixel in a whole image, for example, data in a bit map format in which a defective pixel is set to 1 and a normal pixel is set to 0. This defective pixel map is acquired from the defective pixel extraction unit 103 and stored in a memory (not illustrated) in the information processing apparatus 101.

Flow of processing by the above-described information processing apparatus will be described referring to FIG. 2. First, in step 201, the corrected image acquisition unit 106 acquires an image after a defective pixel is corrected, from the outside defective pixel correction unit 104. Further, in step 202, the partial image region determination unit 107 acquires an image before a defective pixel is corrected, from the outside image capturing unit 102.

Next, in step 203, the defective pixel designation unit 109 acquires a position of the extracted defective pixel. This defective pixel is displayed on the display unit 105 to allow a user to designate it by, for example, the input unit 110. In step 204, the information processing apparatus 101 receives input from the input unit 110 and in step 205, waits until information that designates a defective pixel is input. When the information is input (YES in step 205), in step 206, the defective pixel designation unit 109 designates a defective pixel based on this input.

Next, in step 207, the partial image region determination unit 107 determines an image region including at least the designated defective pixel and a pixel to be used in correction based on a position of the designated defective pixel. Further, in step 208, this image region is extracted from the whole image before correction which is acquired in step 201, and acquired as a partial image. The display control unit 108 generates image data for display in which a region of this partial image and a region of an image after correction corresponding to the partial image are displayed side by side. Then, in step 209, the display control unit 108 executes control to display this image data on a display unit. Furthermore, as the image data for display to be generated by the display control unit 108, when the partial image is displayed, the corrected image acquisition unit 106 extracts and uses an image region around a pixel which corrected a defective pixel designated by the defective pixel designation unit 109. Furthermore, auxiliary image information which will be described below can also be included in the data. Further, this image data is displayed at timing of instructions by a user. The details will be described below with an example of screen display.

In step 210, thereafter, if a confirmation button is pressed to execute end processing, screen display ends. Until end, input by the user is received to display an image for another defective pixel.

Figure 3A:
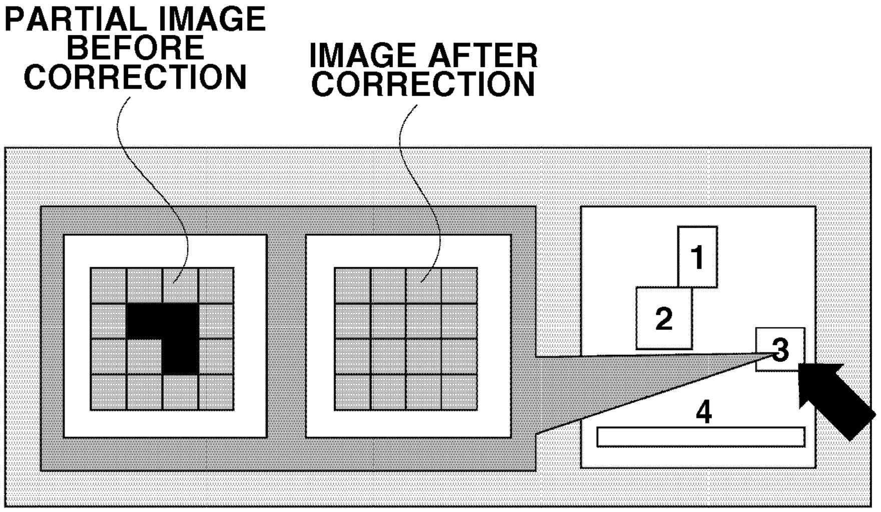
FIGS. 3A and 3B are diagrams illustrating display examples of a screen to be displayed by an information processing apparatus.

FIG. 3 is a diagram illustrating an example of a screen to be displayed on the display unit 105 by the information processing apparatus 101 in the above-described step 209. In an example of screen display illustrated in FIG. 3A, the display control unit 108 generates and displays a diagram illustrating a rough position of a defective pixel in the whole image and image data affixing a number to a position of a defective pixel. The diagram illustrating the rough position of a defective pixel can be generated using the defective pixel map obtained by the defective pixel extraction unit 103 to specify a position of a defective pixel in the whole image. When a mouse pointer is placed on the displayed number, an image region around a defective pixel is similarly displayed. An image having a pixel which corrected a defective pixel is an image having a position and a size corresponding to a partial image before correction. Thus, comparison between the images before and after correction is facilitated. Further, by comparing the images while grasping characteristics of a local image region in the vicinity of a defective pixel, suitability of correction can be confirmed. Furthermore, as another effect, since a partial image is displayed, the image can be displayed in a small image region. A defective pixel is only a very small portion of pixels in the whole image. Thus, it is not necessary to display the whole images before and after correction only to confirm a defective pixel.

Figure 3B:
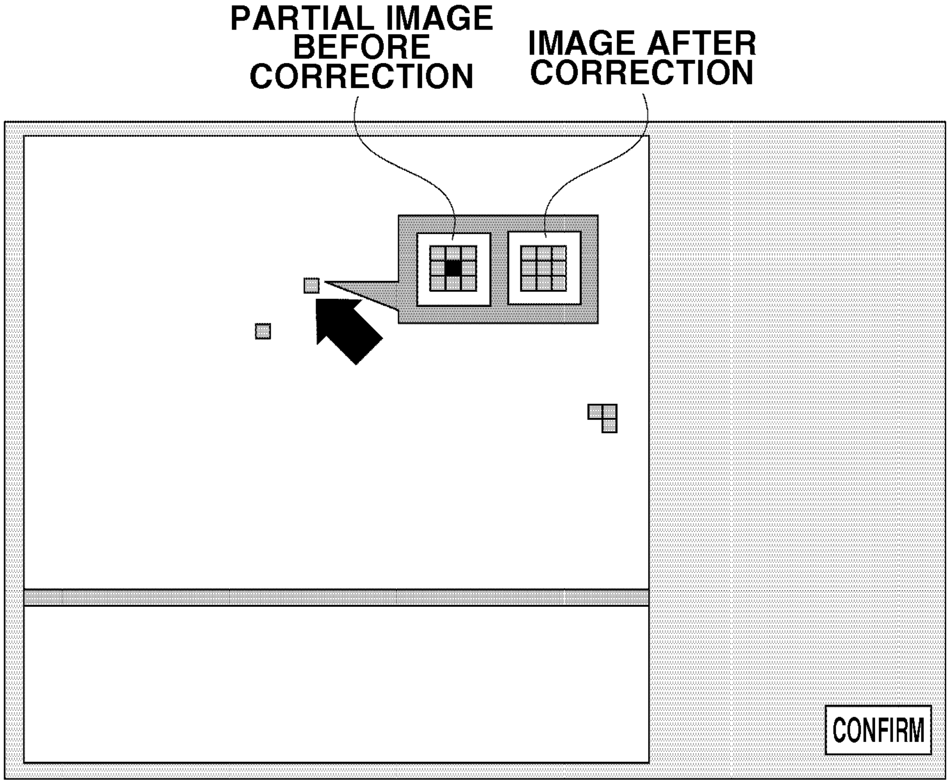

In FIG. 3B, on a screen, the defective pixel map is displayed, and based on information in which a user indicates a position of a defective pixel on the screen, a partial image before correction corresponding to a position of the defective pixel and an image having a pixel which corrected a defective pixel are extracted, and simultaneously displayed side by side. This can be realized by acquiring the defective pixel map from the defective pixel extraction unit 103 to include it in image data for display by the display control unit 108.

Figure 4A:
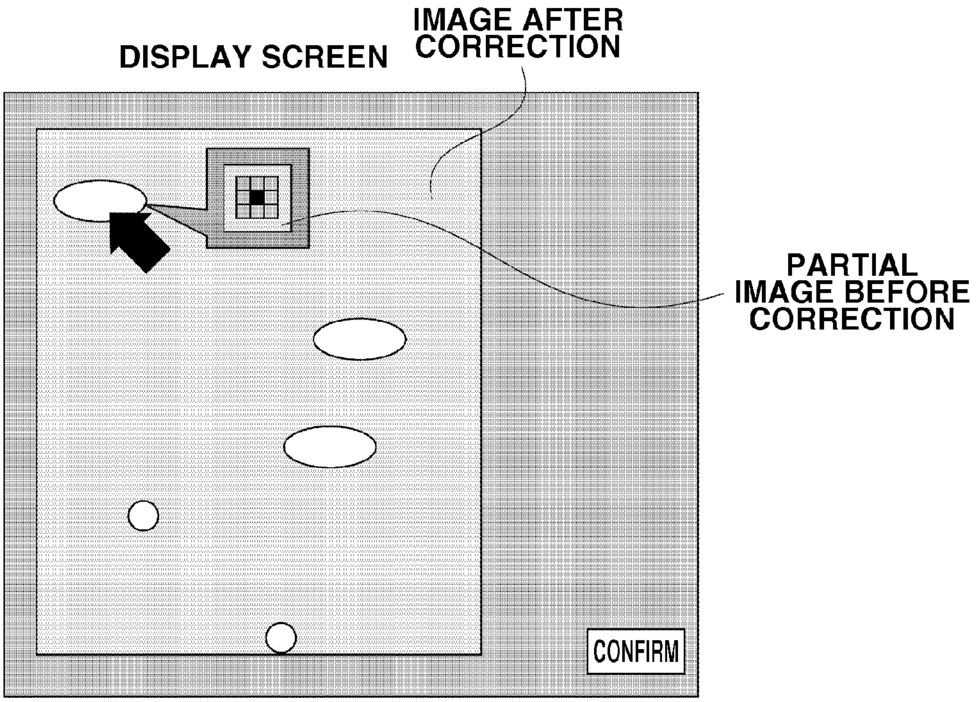
FIGS. 4A and 4B are diagrams illustrating other screen display examples.
Figure 4B:
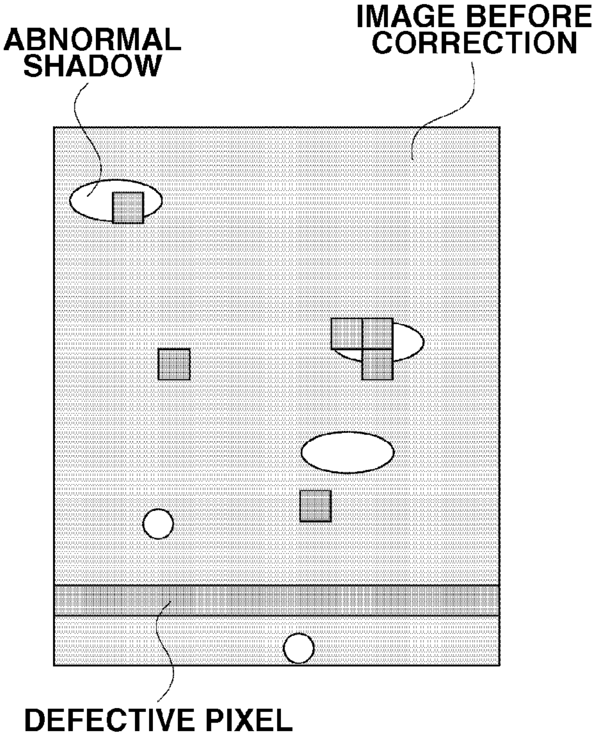

FIG. 4A is a diagram illustrating an example of a screen that displays a defective pixel in an abnormal shadow region. An abnormal shadow includes, for example, a tumor shadow or a micro calcified shadow present on an image of a lung field captured by a radiographic apparatus. The presence or absence of a disease and the situation of progress thereof are determined by the presence or absence of these abnormal shadows. This abnormal shadow can be detected from an image using an algorithm of shadow detection to be used in a computer aided detection (CAD) system. For example, in detection of the tumor shadow, iris filter processing is used and in detection of the micro calcified shadow, a morphology filter processing is used. In the iris filter processing, an iris filter output value which represents a maximum value of the degree of concentration of the gradient of an image signal and a predetermined threshold value are compared. In the morphology filter processing, an output value of morphology calculation processing using a structural element having a size larger than the micro calcified shadow which is a detection target and a predetermined threshold value are compared. FIG. 4B is a diagram illustrating the detected result of an abnormal shadow, and a positional relation between the abnormal shadow and a defective pixel.

When a user moves a cursor on a screen in FIG. 4A to designate an abnormal shadow, a region of the designated abnormal shadow and the defective pixel map are compared. As a result of comparison, when overlapping is present between a defect position shown in the defective pixel map and a region determined as an abnormal shadow region, an image before correction in the overlapping portion is displayed. When a position of the cursor is not in a defective and also abnormal shadow, a pixel before correction is not displayed. When a plurality of defects is present in the region, a plurality of defect is displayed. Thus, correction of a defective pixel present in the abnormal shadow important in diagnosis can be preferentially confirmed.

Figure 5A:
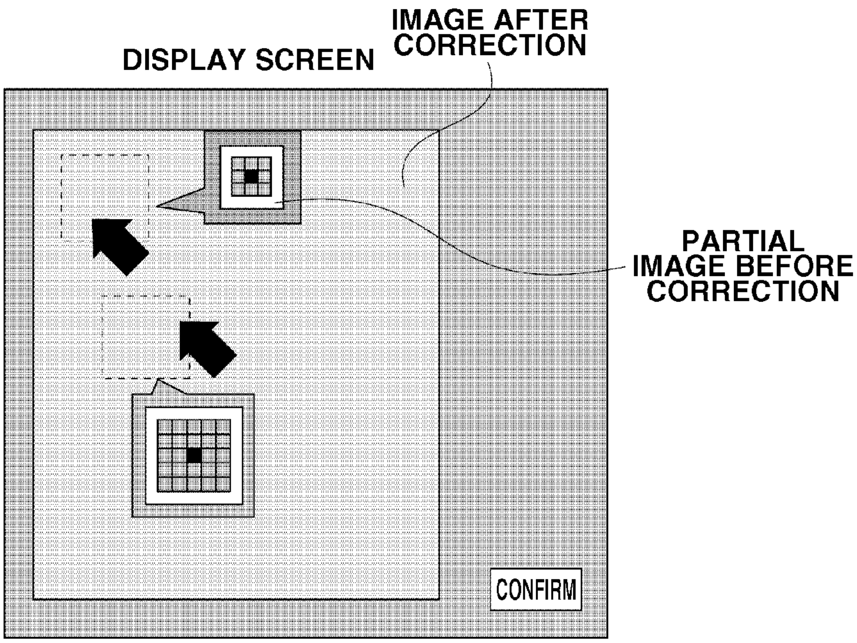
FIGS. 5A and 5B are diagrams illustrating other screen display examples.

FIG. 5A is a diagram illustrating another screen display example. When a pixel which corrected a defective pixel is included in the region, a user displays a partial image having the defective pixel based on information that designates a region in an image after correction. This can be realized by separately generating image data for displaying an image after correction and image data for displaying a partial image before correction at timing of designation by a user.

Figure 5B:
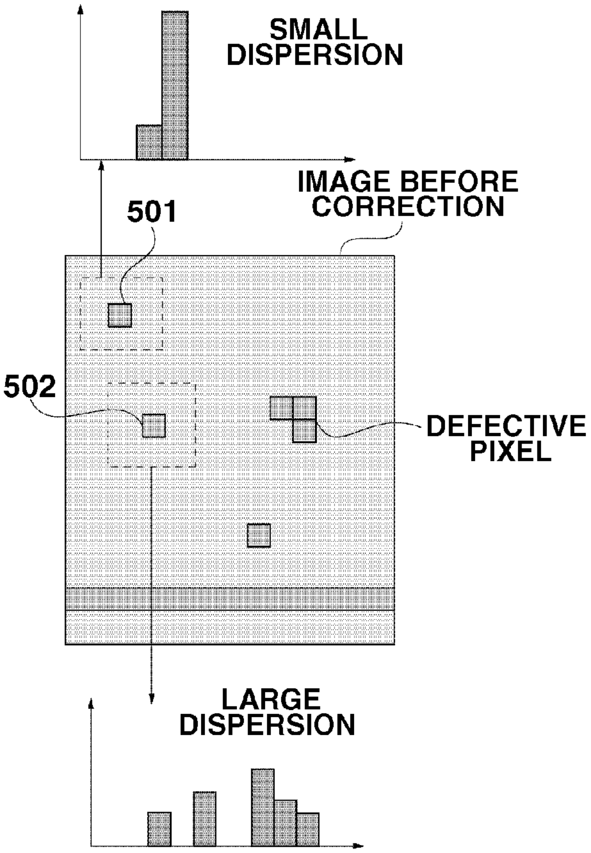

FIG. 5B is a diagram illustrating a position of a defective pixel in this example.

Further, in FIG. 5A, processing is executed in which a size of a partial image to be extracted as an image region having a defective pixel is changed based on a dispersed value in a pixel value around a defective pixel. The dispersed value indicates the degree of variations of a pixel value. The dispersed value which indicates the degree of variations is calculated by an equation (1), setting an N×M region (N and M are three or larger) around a defective pixel on an image before correction.

$$\overline{C} = \frac{1}{k'} \sum_{m=-M}^{m=M} \sum_{n=-N}^{n=N} \alpha \cdot C(x+n,\ y+m) \tag{1}$$

$$\mathrm{Var} = \frac{1}{k'} \sum_{m=-M}^{m=M} \sum_{n=-N}^{n=N} (\alpha \cdot (C(x+n,\ y+m) - \overline{C}))^2$$

where k' is the number of normal pixel in the N×M region, a coordinate (x, y) is a position of a defective pixel in an image before correction and a center or a center of gravity of a group of defective pixels in the group of defective pixels in which a plurality of defective pixels is continuous, C (x+n, y+m) is a pixel value in a coordinate around a defective pixel, and a coefficient α is 1 when a pixel of C(x+n, y+m) is not a defective pixel and 0 when the pixel of C(x+n, y+m) is a defective pixel.

A result of calculation (Var) in a region around a defective pixel 501 illustrated in FIG. 5B is small. In other words, the degree of variations of a pixel value is small. Thus, a display region of the surrounding pixel is narrowed to be displayed. Thus, screen display can be effectively executed. On the other hand, a result of calculation (Var) in a region around a defective pixel 502 is large. In other words, the degree of variations of a pixel value is large. Thus, a local tendency cannot be grasped only by an adjacent pixel and a pixel used in correction. Thus, suitability of correction may not be determined. In this case, the display region of the surrounding pixel is expanded so that characteristics of an image around a defective pixel can be grasped. Thus, suitability of correction can be easily confirmed.

In addition, in FIG. 5A, as described above, when an image after correction includes a region other than an image region corresponding to a partial image, a part of an image after correction corresponding to a partial image before correction displayed on a screen is enclosed by a frame of a dotted line as illustrated in FIG. 5A, so that correspondence relation is specified and the corresponding region is displayed side by side. This can facilitate comparison between local regions and misjudgment is prevented which occurs under influence of an image in a portion which is not related to correction of a defective pixel. Further, use efficiency of a display screen can be improved compared with a case where the whole images before and after correction are displayed side by side. Furthermore, when the whole image after correction is displayed and in addition, a partial image before correction is superimposed, the image regions before and after correction are made translucent for display. Thus, other pixels can be easily viewed while grasping a position of the whole image after correction without concealing an image after correction by superposition.

FIG. 6 is a diagram illustrating image regions around a defective pixel before and after correction. FIGS. 6A to 6F illustrate display forms of a partial image having a defective pixel and an image having a pixel which corrected a defective pixel. These display forms are determined corresponding to a setting of a user or a predetermined setting. In response to these settings, the corrected image acquisition unit 106 or the partial image region determination unit 107 changes a range from which an image is extracted to realize the display. For example, FIG. 6A is a case in which a setting is executed which displays an image including a defective pixel and a pixel to be used in the correction, as a partial image before correction, and an image including only a pixel which corrected a defective pixel as an image after correction. An effect after correction can directly be understood.

Figure 6A:
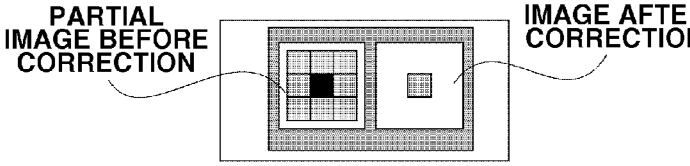
FIGS. 6A, 6B, 6C, 6D, 6E, and 6F are diagrams illustrating display forms of a partial image before correction and an image after correction.
Figure 6B:
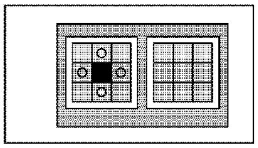
Figure 6C:
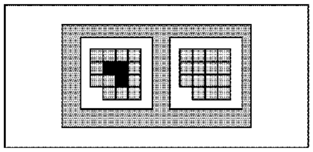

FIG. 6B is a diagram illustrating an embodiment representing the surrounding pixel used when a defective pixel is corrected. Whether a pixel used in correction is suitable can be confirmed by comparing it with the surrounding pixel. Further, a pixel used in correction is displayed with emphasis by affixing a mark “circle,” so that the pixel used in correction can be confirmed. Thus, suitability of correction can be more accurately confirmed. FIG. 6C illustrates a block defect or a group of defective pixels in which a plurality of defective pixels is continuous, and a method for displaying surrounding pixels around the designated defect. Accordingly, information about the designated defect can be clarified.

Figure 6D:
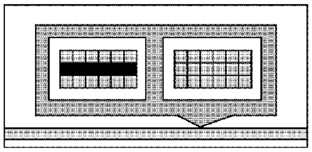
Figure 6E:
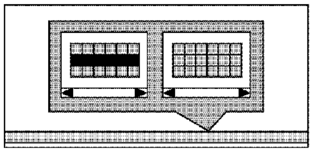

FIGS. 6D and 6E illustrate a group of defective pixels in which a plurality of defective pixels is similarly continuous and formed in a line, and surrounding pixels around the designated defect are displayed. In this case, a size of a block to be displayed at a time has an upper limit. Thus, until the number of pixels or an area exceeds a threshold value, a group of defective pixels is entirely displayed. However, when the area exceeds the threshold value, only surrounding pixels of some fixed regions around the designated pixel are displayed. Accordingly, by dividing a region to be confirmed at a time, use efficiency of a display unit can be improved.

Further, in FIG. 6E, by moving a scrolling bar, a pixel can be confirmed in a more expanded range. Information about a series of defects is more clarified and use efficiency of a display region on a display unit can be improved. Furthermore, an image before correction is expanded above an actual pixel size and displayed. Thus, its confirmation can be facilitated.

Figure 6F:
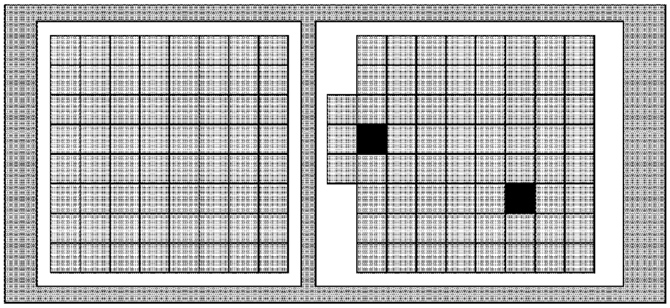

FIG. 6F illustrates a display example when a defective pixel is present in an abnormal shadow which appears in an image. In this case, an image region to be acquired as a partial image before correction is determined corresponding to a size of an abnormal shadow. When an abnormal shadow region is set to be a region of 8×8, the abnormal shadow region is entirely displayed as a display region of a pixel before correction. Accordingly, an abnormal shadow and a defective pixel present in the abnormal shadow can be compared. Further, when a defective pixel is present at the edge of an abnormal shadow, a display region is a region including the whole abnormal shadow region and a region used for defect correction. Thus, suitability of defect correction can be more accurately confirmed.

Figure 7:
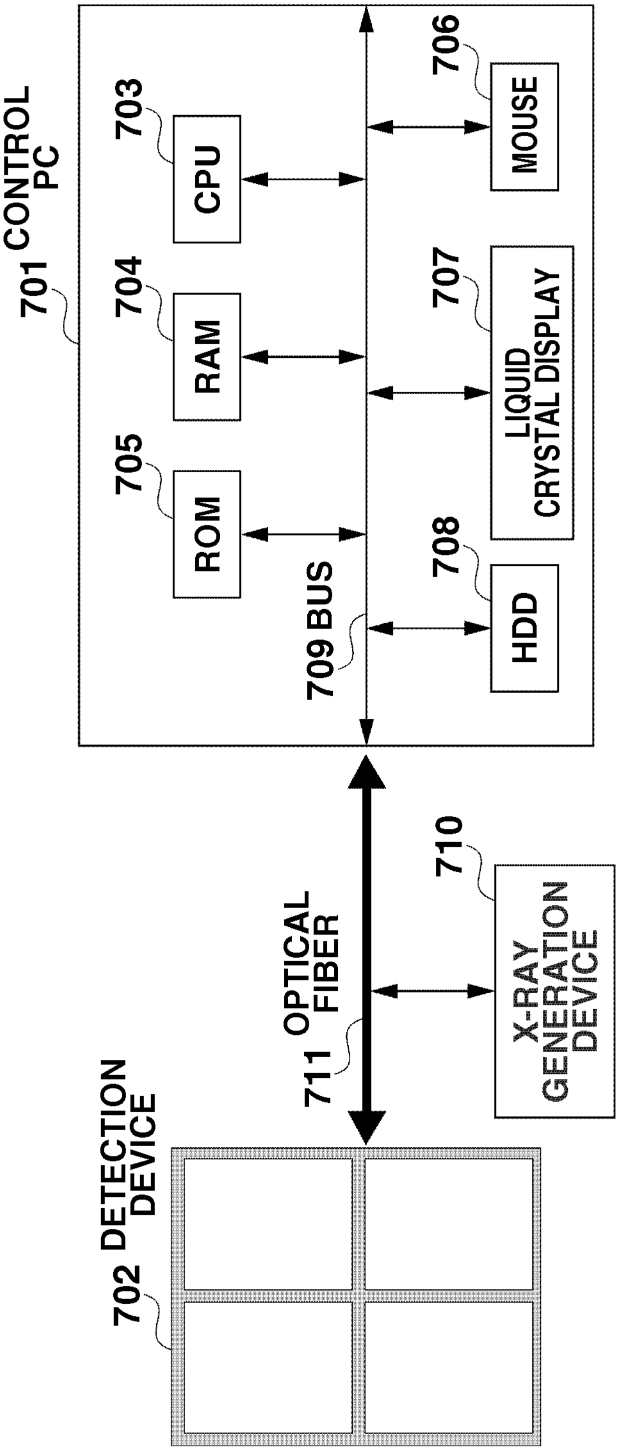
FIG. 7 is a block diagram illustrating an X-ray image capturing system according to a second exemplary embodiment.
Figure 8:
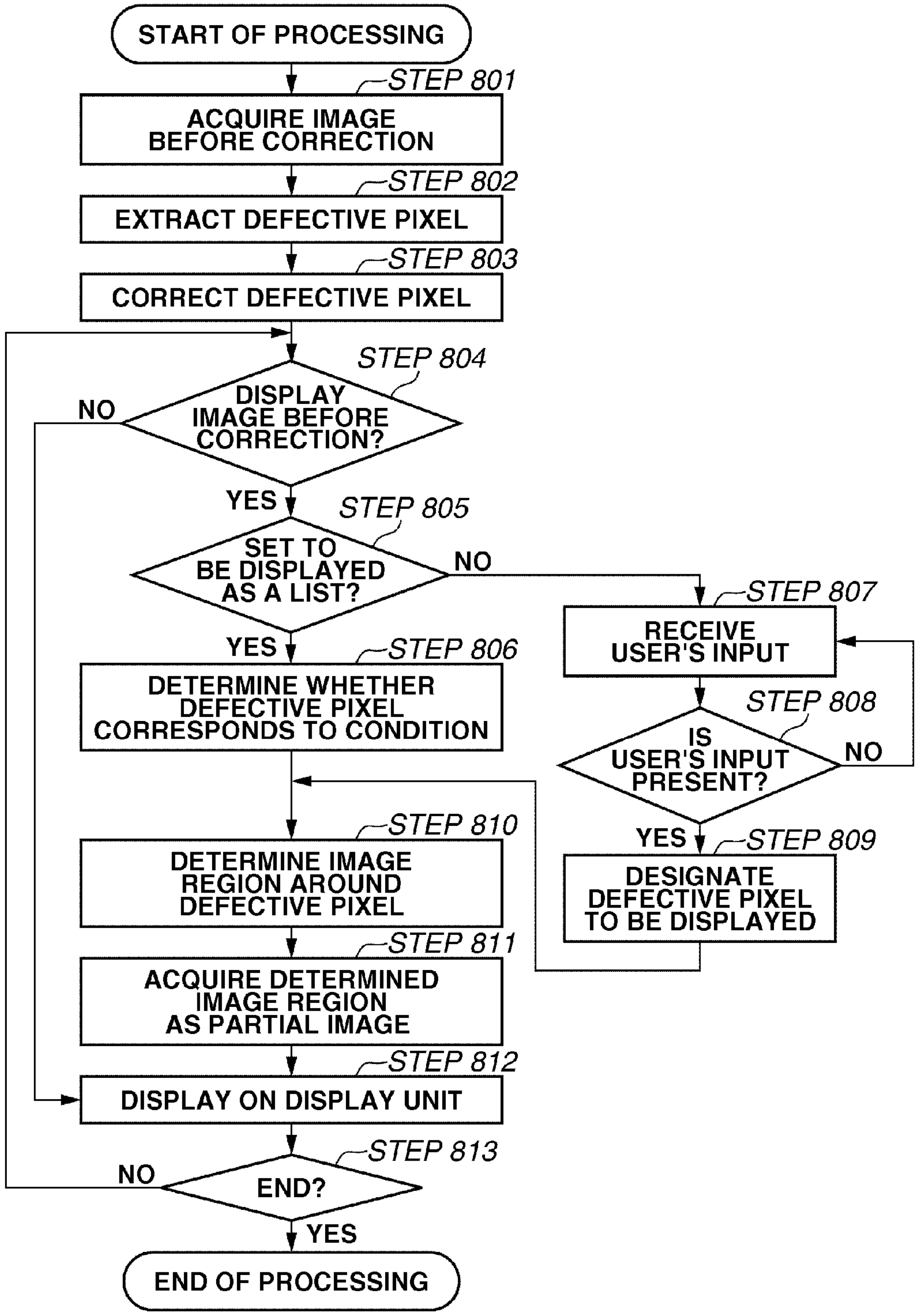
FIG. 8 is a diagram illustrating flow of processing to be executed by an X-ray image capturing system.

A second exemplary embodiment will be described below referring to FIGS. 7 to 11. An X-ray image capturing system or a radiographic system according to the present exemplary embodiment functions as an information processing system that displays a partial image before correction and an image after correction as to a defective pixel corresponding to a predetermined condition. FIG. 7 is a diagram illustrating a configuration of the X-ray image capturing system. FIG. 8 is a flowchart illustrating flow of processing to be executed by this X-ray image capturing system. FIGS. 9 to 11 are examples of a display screen in which a system having a configuration illustrated in FIG. 7 executes processing in FIG. 8 for display on a display unit.

A configuration of the X-ray image capturing system illustrated in FIG. 7 will be described below. An X-ray generation device 710 as a radiation source emits the generated X rays to an object and a detection device 702, in synchronization with which X rays transmitting the object are detected. The detection device 702 converts the detected X rays into an electric charge, accumulates it, reads this as an electric signal, executes predetermined processing such as dark correction and gain correction, and generates an object image. An image generation unit configured to generate the object image may be provided inside the detection device 702 or provided as separate hardware. This detection device 702 functions as an image capturing unit in this system. A control personal computer (PC) 701 acquires this object image via an optical fiber 711 serving as a signal line, stores the image in a storage region of a hard disk drive (HDD) 708, and displays it on a liquid crystal display 707.

The control PC 701 has a central processing unit (CPU) 703, a random access memory (RAM) 704, a read only memory (ROM) 705, a mouse 706, the liquid crystal display 707, and the HDD 708. These devices are connected via a bus 709. The mouse 706 is an input unit for inputting a setting as to whether a partial image before correction is displayed and a setting as to whether a partial image before correction is displayed as a list. The input setting is stored in the HDD 708 and used in processing which will be described below. The liquid crystal display 707 is a display unit configured to display the data generated under control of the CPU 703 which functions as a display control unit. The HDD 708 stores necessary information such as a position of a defective pixel, and images before and after correction. Further, the HDD 708 stores a computer program for executing processing illustrated in FIG. 8 which will be described below. The program is read into the RAM 704 and executed by the CPU 703. Thus, a hardware resource and a computer program of the control PC 701 cooperate to realize display processing of a defective pixel in FIG. 8.

Flow of processing in the above-described X-ray image capturing system will be described referring to FIG. 8. Unless otherwise particularly stated, the CPU 703 executes and orders the processing. As for steps that execute processing similar to that in the first exemplary embodiment, description will be omitted.

First, in step 801, an image before correction captured by the detection device 702 is acquired. Next, an existing defective pixel map is loaded from the HDD 708. Next, in step 802, a defective pixel is extracted from the image before correction which is acquired in step 801 by a well-known method. As an extraction result, if a number of defective pixels has been increased, the defective pixels are rerecorded in the defective pixel map as new defective pixels and the defective pixel map is updated. The updated defective map is stored in the HDD 708. In step 803, the image before correction is subjected to defect correction by the updated defective map and an image after correction is acquired.

Next, in step 804, it is detected whether display of the image before correction is set by setting information in the HDD 708. This setting may also be performed by a user with the mouse 706 or may also be preset. In step 812, when display is not set, similarly to the conventional display method, the image after correction is displayed. This is a case in which a defective pixel is confirmed in advance. When the image after correction is entirely displayed, it is not always necessary to confirm correction processing. It is cumbersome to always display a partial image before correction together with the image after correction as a list at this time. To address this problem, based on the setting as to whether a partial image of the image before correction is to be displayed, processing in step 813 is executed. Thus, inconvenience that a partial image before correction is displayed every time the image after correction is read can be avoided.

On the other hand, when the image before correction is set to be displayed, in step 805, it is detected whether display of the images before and after correcting a defective pixel as a list is set. This setting may also be performed by a user with the mouse 706 or may also be set to display a list in advance.

When display as a list is set, in step 806, it is determined whether it is a defective pixel corresponding to a predetermined condition as a defective pixel for display. As the predetermined condition, first, all defective pixels may be required as conditions. Further, it may be determined whether a condition that defective pixels are a group of defective pixels in which a plurality of defective pixels is continuous. Furthermore, as another example, when an image is an image in a lung field of an object, it may be determined whether it corresponds to conditions that it is a defective pixel present in an abnormal shadow such as a lesion appearing in an image. This will be described below. Still furthermore, a defective pixel which corresponds to conditions determined by a user in advance may also be displayed. With respect to a defective pixel selected by these conditions, an image after correction or a partial image before correction is acquired to generate image data for display. Steps 807 to 813 are processing similar to steps 204 to 210 in the first exemplary embodiment. Thus, their description will be omitted.

Figure 9A:
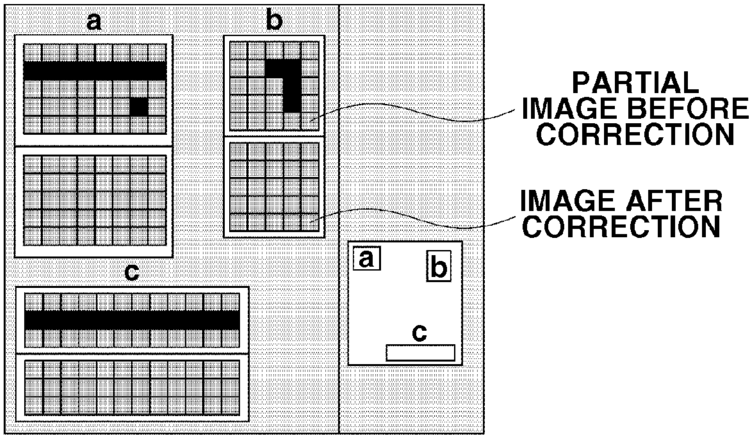
FIGS. 9A, 9B, and 9C are diagrams illustrating display examples of a screen to be displayed by an X-ray image capturing system.
Figure 9B:
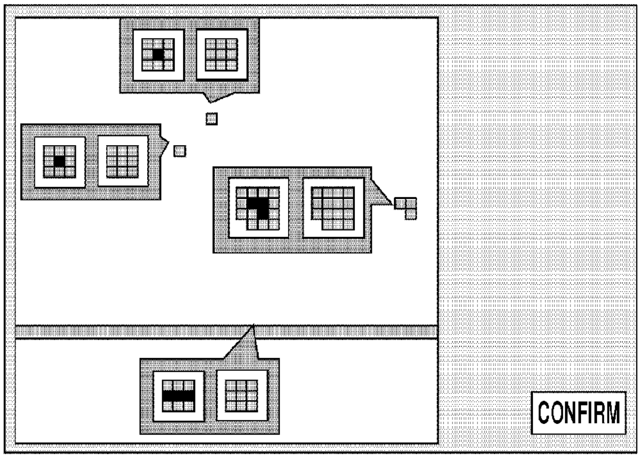
Figure 9C:
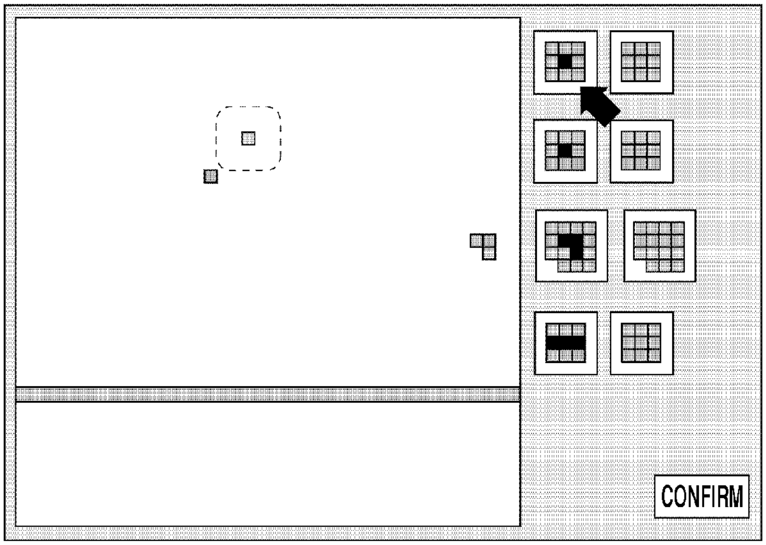

FIG. 9 is a diagram illustrating an example of a screen to be displayed by the liquid crystal display 707 on the X-ray image capturing system through the above-described processing and illustrates a display example in which all defective pixels are displayed as a list. This can be realized by acquiring positions of all defective pixels from a defective pixel map. In FIG. 9A, a partial image having a defective pixel and an image which corrected a defective pixel are displayed for each defective pixel. On the right side of the screen, display indicating a position of this extracted partial image in the whole image is executed. Thus, the extracted images before and after correction are displayed as a list, thereby allowing correction of a defective pixel to be confirmed while efficiently using a display region of the screen. FIG. 9B illustrates other screen examples to be displayed as a list. Overlay display is executed on an image to clearly find a position of information about each defective pixel. Further, in FIG. 9C, in order to confirm the whole image, confirmation of the corresponding defect position is more facilitated. This is realized according to information that indicates a position of a defective pixel, as follows. The data is changed to image data to which display for specifying correspondence relation is added that encloses the position with a frame for garnishing a defect in a corresponding position on an image. Or display for specifying correspondence relation is added which changes colors or the like, and these are displayed on a display unit.

Figure 10A:
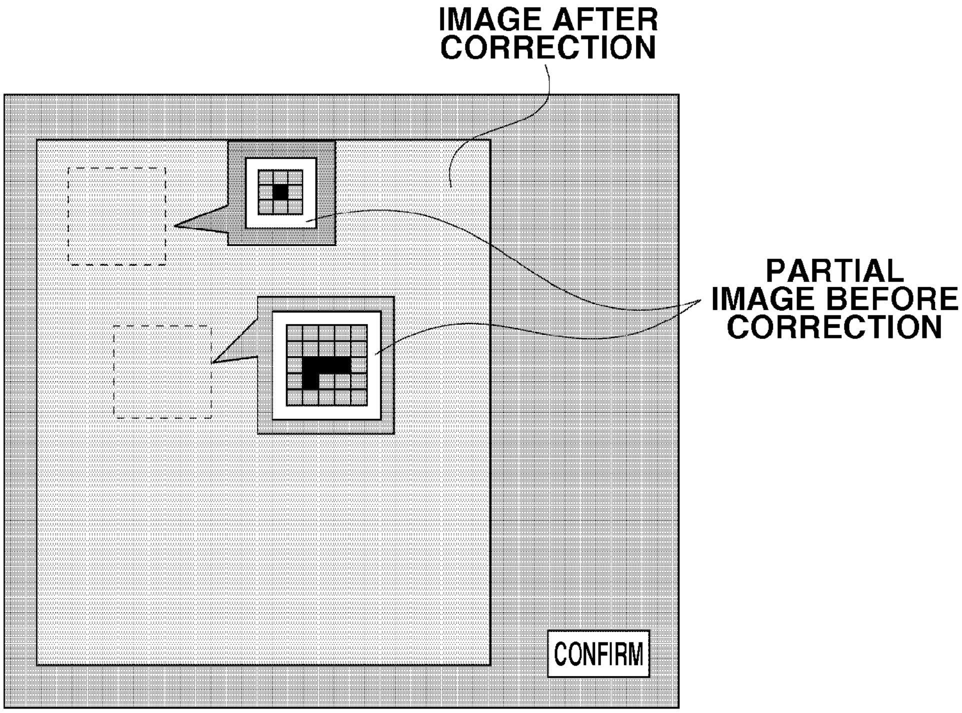
FIGS. 10A and 10B are diagrams illustrating other screen display examples.
Figure 10B:
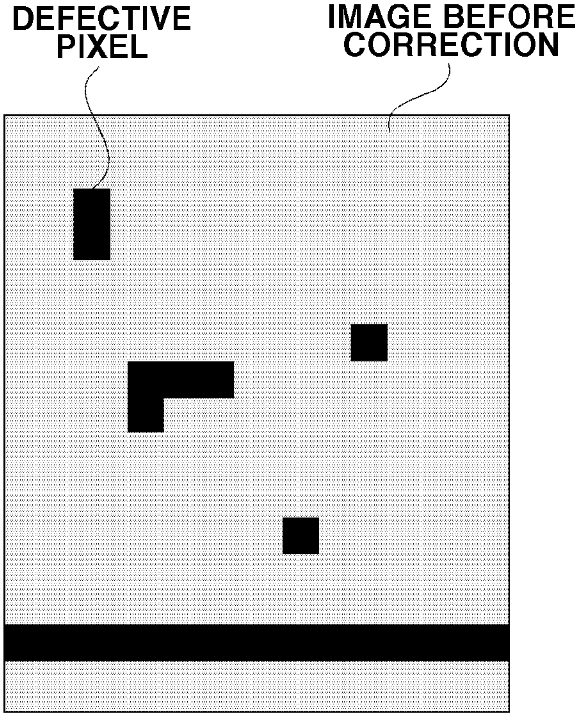

FIG. 10A illustrates other screen examples to be displayed as a list. It is determined whether a defective pixel forms a group of defective pixels and pixels determined to be the group of defective pixels is displayed as a list. This can be realized by referring to the defective pixel map and detecting pixels as to which adjacent two pixels or more pixels are defective pixels. FIG. 10B is a diagram illustrating a position of a defective pixel in this example. In FIG. 10A, an image region around a defective pixel and an image after correction are displayed, and a region corresponding to the image region around the displayed defective pixel is indicated by a dotted line. By this display, a group of defective pixels greatly influencing an image can be confirmed. Further, display of an isolated defect which influences image quality to a relatively smaller degree is omitted. Thus, time efficiency required to confirm a defective pixel is improved, and use efficiency of a screen is improved.

Figure 11A:
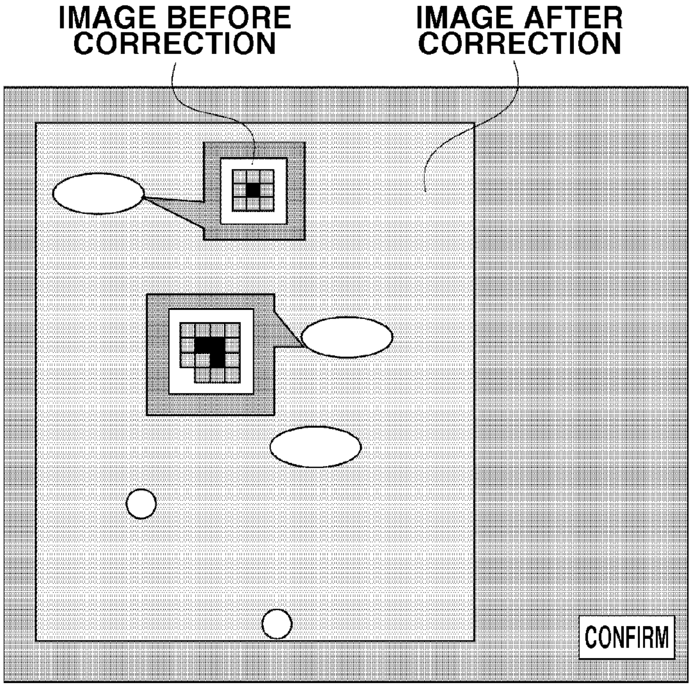
FIGS. 11A and 11B are diagrams illustrating other screen display examples.
Figure 11B:
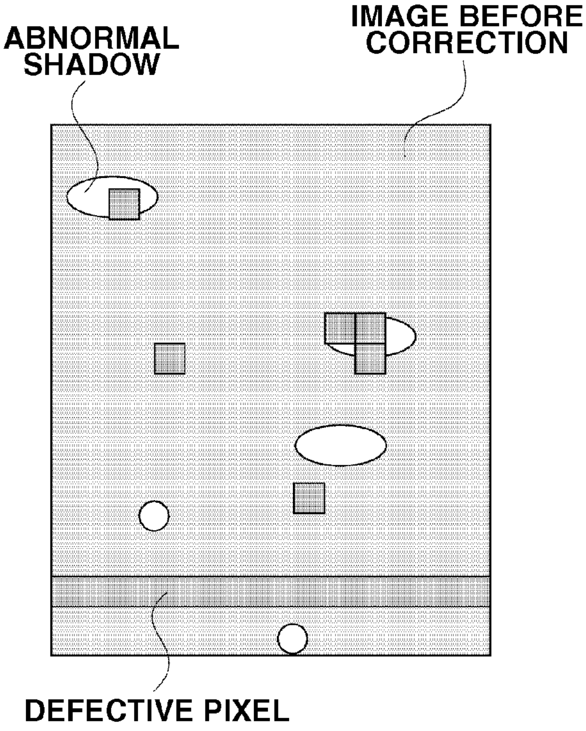

FIG. 11A illustrates other screen examples to be displayed as a list and a diagram illustrating an example of a screen which displays pixels present in an abnormal shadow region among defective pixels. This can be realized by comparing the defective pixel map and position information about an abnormal shadow extracted by an abnormal shadow extraction algorithm. FIG. 11B is a diagram illustrating the detected result of abnormal shadow and a position relation between the abnormal shadow and a defective pixel. In FIG. 11A, the abnormal shadow region and the defective map are compared. If it is determined that a defect position indicated in the defective map and a region as the abnormal shadow region are superimposed, a partial image including the defective pixel is displayed. If a plurality of defects is present in the region, the plurality of defects is displayed. Thus, pixels present in the abnormal shadow among defective pixels which appear on an image can be displayed as a list, correction processing of a defective pixel which has a significant influence on diagnosis can be confirmed.

A third exemplary embodiment is partially described in the first exemplary embodiment. In the present embodiment, an image before correction or an image after correction is actually expanded and displayed. Thus, a user can confirm correction in detail.

In the present exemplary embodiment, the CPU 703 that functions as a display control unit expands and displays an image corresponding to a determined partial region. Since a defective pixel included in a partial region, a pixel used in correction, and other pixels are expanded, a user can confirm correction of a defective pixel in detail. Other system configurations are similar to that in the first exemplary embodiment and their description will be omitted. Further, similarly to the second exemplary embodiment, a system may be configured using a computer program. In this case, the computer program is stored in the ROM 705 or the HDD 708. The computer program is a program to realize processing illustrated in each functional block in FIG. 1 and a flowchart in FIG. 2, and to realize screen display which will be described below.

Figure 12A:
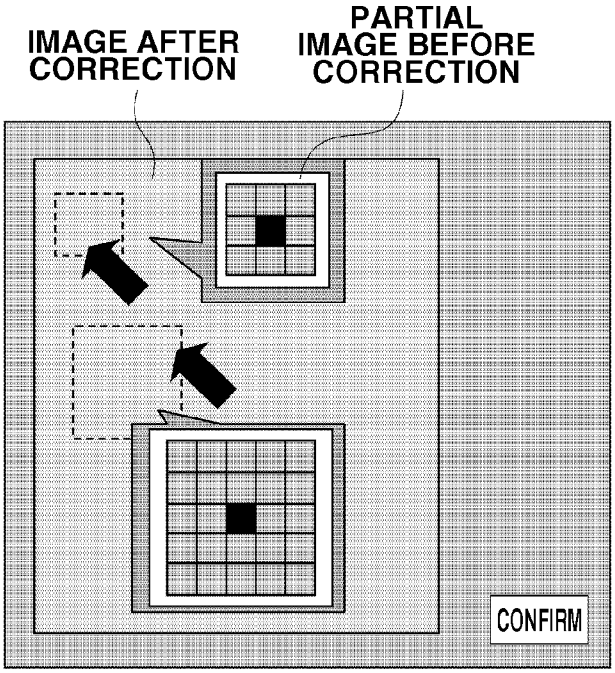
FIGS. 12A and 12B are diagrams illustrating screen display examples according to another exemplary embodiment.

Referring to FIG. 12, an example of a display screen to be displayed on the liquid crystal display 707 by an information processing system according to the present exemplary embodiment will be described. On the display illustrated in FIG. 12A, an image after correction obtained by the detection device 702 to which various types of correction such as dark correction, gain correction, and defective pixel correction have been applied, and a partial image before correction are displayed. The partial image is expanded and displayed. A user operates the mouse 706 to select a region in an image after correction to display an image before a defective pixel corresponding to the region is corrected. Thus, image information in the vicinity of a defective pixel before correction can be more finely confirmed. Further, by comparing an image after correction and an expanded partial image before correction, while confirming the tendency of image information about the whole image after correction, correction of a defective pixel can be confirmed in detail.

An image before not only defective pixel correction but also gain correction may also be arranged or switched to be displayed. Thus, whether to be a pixel to be detected as a defective pixel by gain correction can be determined. Further, a partial image after correction corresponding to a partial image before correction may also be expanded, and arranged or switched to be displayed. Thus, since images before and after correction are expanded, correction of a defective pixel can be confirmed in further detail.

Furthermore, in a region selected by a user, a pixel obtained by correcting a defective pixel may also be displayed by flashing with a specified color such as white or black. Thus, since correction of a defective pixel can be displayed together with a position of a defective pixel, suitability of correction in an image can be confirmed by a user.

Figure 12B:
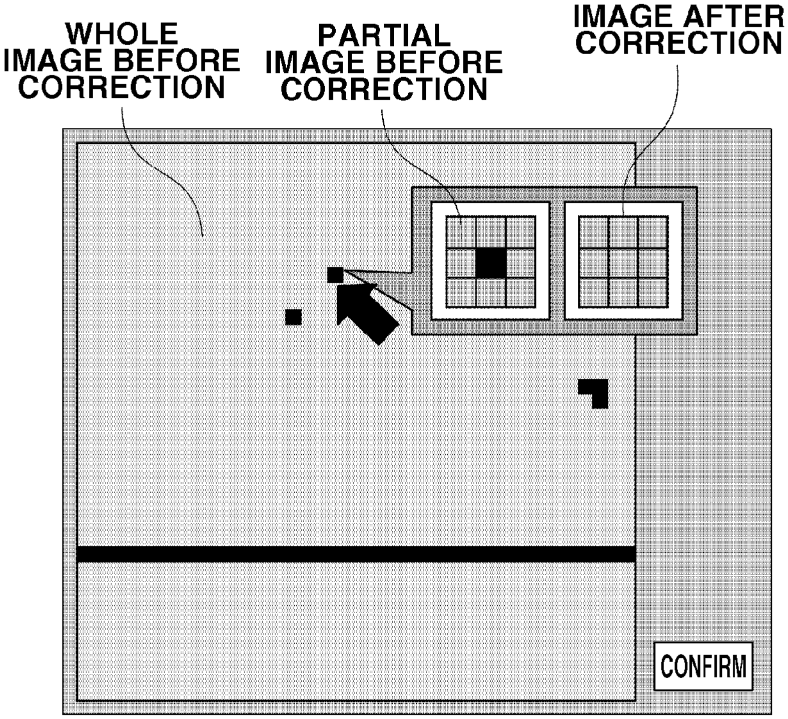

A display screen illustrated in FIG. 12B expands and displays images before and after defective pixel correction with an image before defective pixel correction. A user operates the mouse 706 to put a cursor on a defective pixel indicated in an image before correction. Thus, partial regions before and after correction are determined, and expanded and displayed. For the partial region, a fixed value or a dispersed value of a pixel value around a defective pixel may be used. The partial region may only be a region including a defective pixel and a pixel to be used in correction of a defective pixel. As an image before defective pixel correction, an image after dark correction and gain correction of a defective pixel is performed is displayed. Thus, correction of a defective pixel can be confirmed in detail.

In FIG. 12B, an example in which partial regions before and after correction are displayed side by side has been illustrated but the exemplary embodiment is not limited to this. The partial regions may also be switched over and displayed. For example, display of images before and after correction may be switched over after elapse of fixed time in the same position on a display screen. In this case, how the regions are corrected can be compared between before and after correction.

In the above-described exemplary embodiment, a defective pixel or an anomalous pixel is a pixel that does not indicate a normal value in an image. However, application of the present invention is not limited to this. The present invention can also be applied to a case where partial characteristics of a sensor are abnormal. For example, the present invention can also be applied to a case where characteristics of an electric signal value output according to a dose of radiation with which the detection device 702 is irradiated, are defective, or to a case where the detection device 702 does not react to radiation at all. Further, a defective pixel may be grasped as abnormality of a pixel circuit or output thereof in a detection device.

Furthermore, a pixel extracted from an image obtained based on a predetermined rule from the detection device which has not been subjected to dark correction or gain correction may be a defective pixel or an anomalous pixel. Still furthermore, if a pixel is largely different in dose characteristics compared with other pixels and a specific dose is emitted, and the pixel is saturated while other pixels are not saturated due to a difference in characteristics, the pixel may be defined as a defective pixel or an anomalous pixel. In this case, a pixel defined as a defective pixel or an anomalous pixel is changed corresponding to a dose with which the detection device 702 is irradiated.

As an example of an anomalous pixel, a defective pixel has been taken and an application example of the defective pixel has been described. However, the application example of the present invention is not limited to this. An anomalous pixel other than a defective pixel may also be a subject of the present invention.

Figure 13:
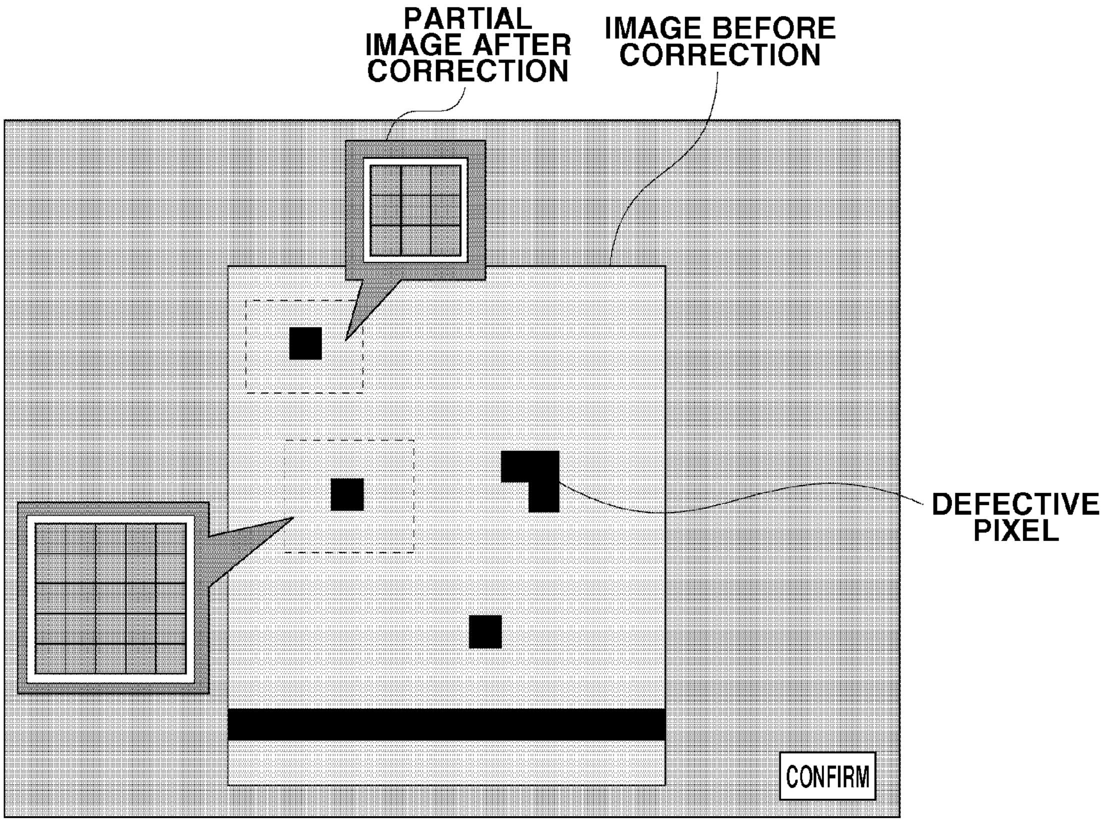
FIG. 13 is a diagram illustrating an example of screen display according to another exemplary embodiment.

In examples of screen display illustrated in FIGS. 4 and 5 in the above-described first exemplary embodiment, FIGS. 10 and 11 in the second exemplary embodiment, and FIG. 12A in the third exemplary embodiment, a partial image of an image before correction is displayed overlapping with the whole of an image after correction or the defective pixel map. However, a partial image after correction may be displayed and superimposed with the whole of an image before correction. A screen display example in this case is illustrated in FIG. 13. Thus, what image is obtained when defective pixel correction is applied to an image before correction, can be compared for each region around a defective pixel.

Further, screen display according to the second exemplary embodiment may also be performed using the information processing apparatus according to the first exemplary embodiment. Furthermore, similarly, screen display according to the first exemplary embodiment may also be performed using the X-ray image capturing system according to the second exemplary embodiment. In this case, a program for executing processing illustrated in FIG. 2 in the first exemplary embodiment is stored in the HDD 708 and the CPU 703 executes the program, thereby realizing screen display.

Still furthermore, the program that realizes a function of the above-described exemplary embodiment may be supplied to an information processing apparatus or system via a network or a storage medium. In this case, an apparatus or a system for storing, reading, and executing the supplied program, or this program or storage medium itself constitutes the present invention.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-198410 filed Aug. 28, 2009, which is hereby incorporated by reference herein in its entirety.

What is claimed is:

1. An information processing apparatus comprising:

an acquisition unit configured to acquire a predetermined image and an image after correction which corrected an anomalous pixel of the predetermined image;

a determination unit configured to determine, based on the corrected anomalous pixel, a partial region of the predetermined image including the anomalous pixel and a pixel used for correcting the anomalous pixel; and a display control unit configured to display an image expanding the partial region and the image after correction.

2. The information processing apparatus according to claim 1, wherein the determination unit is configured to determine a partial region including the anomalous pixel of the predetermined image and a pixel used in the correction thereof, wherein the display control unit displays side by side, the determined partial region and a region of the image after correction corresponding to the acquired partial region, on a display unit.

3. The information processing apparatus according to claim 2, wherein the determination unit determines the partial region according to the degree of variations of a pixel value in a pixel around the anomalous pixel.

4. The information processing apparatus according to claim 2, wherein the determination unit determines the partial region according to an abnormal shadow region of the predetermined image.

5. The information processing apparatus according to claim 2, wherein the display control unit displays a correspondence relation in a position that corresponds to the partial region of the image after correction.

6. The information processing apparatus according to claim 2, wherein the determination unit determines the partial region based on the position of an anomalous pixel in the predetermined image.

7. An information processing apparatus comprising:

an acquisition unit configured to acquire a predetermined image and an image after correction which corrected an anomalous pixel of the predetermined image; and a display control unit configured to display an image expanding a partial region of the predetermined image including the anomalous pixel and a pixel used for correcting the anomalous pixel, and the image after correction, wherein the display control unit displays an anomalous pixel corresponding to a predetermined condition, wherein the predetermined condition is either of a condition that a group is formed in which a plurality of the anomalous pixels is continuous, and a condition that the anomalous pixel is present within an abnormal shadow of the predetermined image.

8. The information processing apparatus according to claim 1, wherein the display control unit displays the relevant portion being translucent when the image after correction and the partial region are displayed overlapping with each other.

9. The information processing apparatus according to claim 1, wherein the display control unit expands and displays the partial region of the predetermined image and a region of the image after correction corresponding to the partial region.

10. An information processing apparatus comprising:

an acquisition unit configured to acquire a predetermined image and an image after correction which corrected an anomalous pixel of the predetermined image; and a display control unit configured to display an image expanding a partial region of the predetermined image including the anomalous pixel and a pixel used for correcting the anomalous pixel, and the image after correction, wherein the display control unit changes a size of a screen region that displays the partial region, corresponding to an area of a group of anomalous pixels in which a plurality of the anomalous pixels is continuous.

11. The information processing apparatus according to claim 1, wherein the display control unit further has a setting unit configured to set whether the partial region is displayed.

12. The information processing apparatus according to claim 1, wherein the anomalous pixel is a defective pixel.

13. An information processing apparatus comprising:

a determination unit configured to determine, based on a pixel which has been corrected, a partial region including the pixel and a pixel used in the correction thereof, in an image obtained by correcting an anomalous pixel of a predetermined image; and a display control unit configured to display side by side the determined partial region and a region of the predetermined image corresponding to the partial region, on a display unit.

14. An information processing method comprising:

acquiring a predetermined image and an image after correction which corrected an anomalous pixel of the predetermined image by an acquisition unit;

determining, based on the corrected anomalous pixel, a partial region of the predetermined image including the anomalous pixel and a pixel used for correcting the anomalous pixel; and displaying an image expanding the partial region and the image after correction, on a display unit by the display control unit.

15. A computer-accessible medium having a computer program causing a computer to execute processing for acquiring a predetermined image and an image after correction which corrected an anomalous pixel of the predetermined image by an acquisition unit;

processing for determining, based on the corrected anomalous pixel, a partial region of the predetermined image including the anomalous pixel and a pixel used for correcting the anomalous pixel;

and processing for displaying an image expanding the partial region and the image after correction, on a display unit by a display control unit.

16. A radiographic system comprising:

a detection device for detecting radiation emitted from a radiation source and passing through an object to generate an electric signal having a value corresponding to a dose;

a generation unit configured to generate an image of the object based on the electric signal generated by the detection device;

a correction unit configured to correct a pixel determined to be an anomalous pixel due to characteristics of the value with respect to the dose of the detection device, among pixels which constitute the generated image;

a region acquisition unit configured to acquire, based on the anomalous pixel, a partial region including the anomalous pixel and a pixel used for correcting the anomalous pixel, by the correction unit in the generated image; and a display control unit configured to display an image expanding the acquired partial region and an image which corrected the anomalous pixel by the correction unit, on a display unit.

17. An image processing apparatus for a radiation image, comprising:

an acquisition unit configured to acquire a radiation image to be corrected;

a correction unit configured to correct an anomalous pixel in the radiation image to obtain a corrected radiation image;

a determination unit configured to determine a partial region in the corrected radiation image including the corrected anomalous pixel and pixels used in the correction unit; and a display control unit configured to cause a display unit to display the radiation image to be corrected, enlarge the partial region, and display the enlarged partial region.

18. The image processing apparatus of claim 17, wherein the correction unit configured to correct multiple anomalous pixels in the radiation image;

the determination unit configured to determine partial regions in the corrected radiation image each including at least one of the multiple corrected anomalous pixel and pixels used in the correction unit; and the display control unit is configured to enlarge the partial regions and display the enlarged partial regions.

19. The image processing apparatus of claim 17, wherein the display control unit changes a size of a screen region that displays the partial region, corresponding to an area of a group of anomalous pixels in which a plurality of the anomalous pixels is continuous.

20. An image processing apparatus for a radiation image, comprising:

a determination unit configured to determine, based on a specific pixel corresponding to an anomalous pixel, a partial region in a radiation image including a pixel corresponding to the anomalous pixel; and a display control unit configured to cause a display unit to display a radiation image, enlarge the partial region, and display the enlarged partial region, wherein the display control unit changes a size of a screen region that displays the partial region, corresponding to an area of a group of anomalous pixels in which a plurality of the anomalous pixels is continuous.

* * * * *